April 5, 1960  T. D. KEEHAN  2,931,411
SCREW FASTENER
Filed June 8, 1956
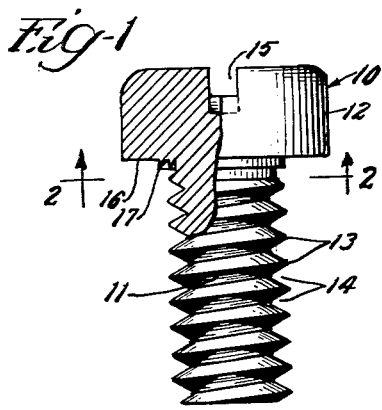
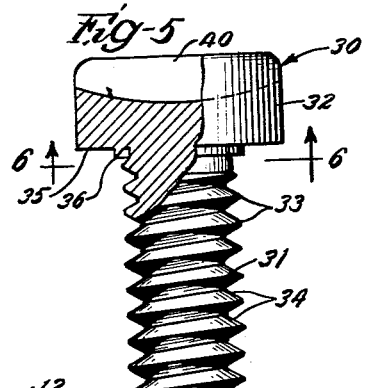
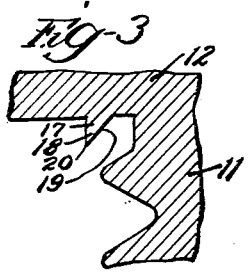
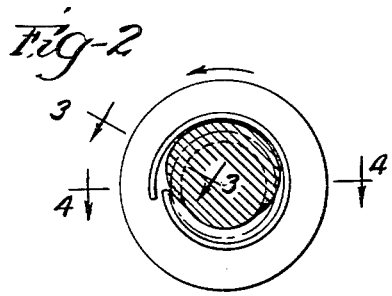
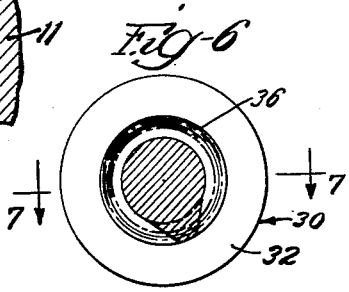
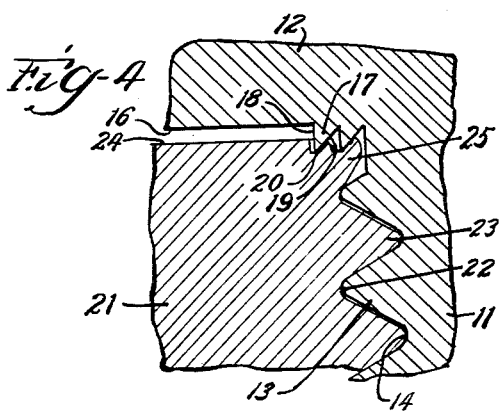
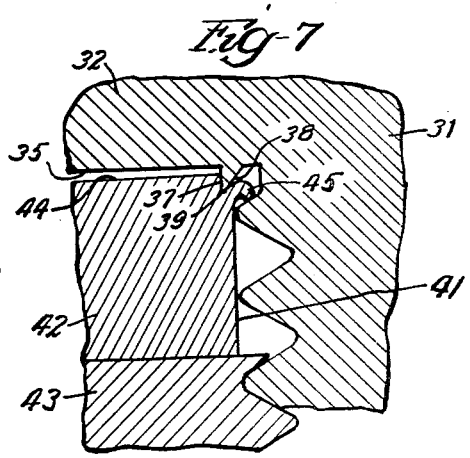
INVENTOR.
Thomas D. Keehan
BY
Cromwell, Greist & Warden
Attys.

United States Patent Office 2,931,411
Patented Apr. 5, 1960

2,931,411

SCREW FASTENER

Thomas D. Keehan, Chicago, Ill.

Application June 8, 1956, Serial No. 590,310

1 Claim. (Cl. 151—22)

This invention relates to fasteners and is more particularly concerned with improvements in a screw type fastener having an arrangement for locking the same against accidental reverse turning movements when it is in use. This application is a continuation-in-part of my earlier filed, copending application, Serial No. 519,741, filed July 5, 1955, now abandoned, and entitled Screw Fastener.

It is a general object of the invention to provide a screw type fastener which is constructed so that upon being properly assembled with the work it will be locked in engagement therewith, at least to the extent that self loosening is effectively resisted under normal conditions short of deliberate forced loosening thereof.

It is a more specific object of the invention to provide a screw type fastener having associated therewith self-locking elements which act on the work in such a manner that upon final interengagement between the work and the fastener accidental reverse turning of the fastener is effectively prevented.

It is a further object of the invention to provide a fastener of the screw threaded type which is adapted to be positioned in threaded engagement in an aperture in the work and which is so constructed that, upon being properly turned into the work and finally seated in the aperture, it forms on the work an obstruction which is effective to resist movement of the threaded portion of the fastener in a reverse direction and consequent loosening of the fastener.

It is another object of the invention to provide a screw type fastener having a threaded stem member, with the stem threads and the groove between the same being adapted to enter and receive the work material and a head member having a ring-like rib projecting from the inner surface of the head member adjacent the stem member which acts to displace the work material into the path of the threads upon movement of the head member to a position against the work and thereby to block the movement of the stem in the direction to retract the same.

It is still another object of the invention to provide a screw type fastener having a threaded stem which is adapted to be turned into the work, with the stem threads and the groove between the same entering and receiving the work material, a head on said stem and a spiraled work engaging rib formation on said head which acts to displace the work material inwardly in the direction of the stem as advancement of the stem causes the head to approach a position of engagement against the work whereby to form an obstruction which is effective to resist retractive turning of the stem.

These and other objects of the invention will be apparent from a consideration of the several forms of the fastener and the operation thereof which are illustrated in the accompanying drawings, wherein:

Fig. 1 is a side elevation with portions broken away of a screw fastener which embodies the principles of the invention;

Fig. 2 is a section taken on the line 2—2 of Fig. 1;

Fig. 3 is a fragmentary section to an enlarged scale taken on the line 3—3 of Fig. 2;

Fig. 4 is a fragmentary section to an enlarged scale taken on the line 4—4 of Fig. 2 and with the fastener inserted in a threaded aperture in a work piece;

Fig. 5 is a side elevation of another form of the fastener;

Fig. 6 is a section taken on the line 6—6 of Fig. 5; and

Fig. 7 is a fragmentary section to an enlarged scale taken on the line 7—7 of Fig. 6 and with the fastener inserted in a plain aperture in a work piece.

Referring to Figs. 1 to 3 of the drawings, there is illustrated a screw fastener 10 which incorporates therein the principal features of the invention. In the form shown the fastener 10 comprises a shank or stem portion or member 11 and an integral head portion or member 12 at one end thereof. The stem member 11 is provided with rolled threads 13 which follow a spiral path and are separated by grooves 14. The head member 12 is integrally connected with one end of the stem member 11 and may be round and flat as shown, or any other suitable shape. A kerf or slot 15 is provided for receiving the operating blade of a screw driver or other operating tool. The head member 12 is shaped to provide an inwardly facing under surface 16 which has the portion thereof adjacent the stem member 11 in a plane which is normal to the long axis of the latter. Adjacent the periphery of the stem 11 a downwardly projecting spiral shoulder or rib formation 17 is provided on the under surface 16 of the head member 12. Preferably, the spiral rib formation 17 is triangular in cross section with an outwardly facing vertical wall 18 and an inwardly facing upwardly and inwardly extending diagonal wall 19 which provides a relatively sharp downwardly projecting terminal edge 20. The spiral rib formation 17 begins along side the stem 11 at a point relative to the periphery of the stem member 11 where the edge 20 thereof is slightly inside the outside diameter of the threads 13. The rib formation 17 spirals outwardly and extends slightly more than a full turn around the stem 11, circling the stem 11 in a direction which is opposite to the direction of the threads 13 to a point beyond the outside diameter of the threads 13. The depth of the rib formation 17 may vary from one end of the same to the other.

In the manufacture of the fastener 10 the spiral rib formation 17 will be provided on the blank before the threads 13 are rolled on the stem 11 and thereafter the threads will be cut or rolled on to a point as close to the projecting rib 17 as possible without damaging the rib 17. Preferably, the fastener with its locking rib 17 will be hardened so that the latter will readily displace the softer material with which the fastener is intended to be used. The work material must, of course, be somewhat softer than the hardened edge 20 of the rib formation 17 and have a certain degree of plasticity in order for the edge 20 of rib 17 to be effective in use.

In using the fastener 10 the stem member 11 is inserted in an aperture in a work piece 21 (Fig. 4) with the stem threads 13 engaging in the grooves 22 in the work 21 and the grooves 14 receiving the threads 23. As the head member 12 is rotated to cause the under face 16 to approach and engage with the upper or outer surface 24 of the work piece 21 the edge 20 of the locking rib formation 17 will bite into the work material around the fastener receiving aperture and displace the edge portions inwardly toward the stem member 11. This reduces the diameter of the entrance to the fastener receiving aperture and provides an inwardly projecting burr or shoulder 25 which constitutes an obstruction in the path of the threads 13 on the stem member 11 and which resists any tendency of the stem member 11 to rotate in the reverse direction. The fastener may, of course, be removed deliberately from the aperture with the application of sufficient turning force in the direction to withdraw the same, that thereafter the fastener may be readily reinserted in the aperture.

Another form of the fastener is illustrated in Figs. 5 to 7. In this form the fastener 30 comprises a stem 31 and an integral head 32. The stem 31 is provided with threads 33 separated by grooves 34 with the threads terminating short of the under surface 35 of the head 32. The head is provided with a ring-like projecting rib formation 36 on the bottom surface 35 which is circumferentially spaced from the base of the stem 31. The rib formation 36 is triangular in cross section with an outer peripheral vertical wall 37 (Fig. 7) and an inner tapering wall 38, the two walls merging to provide a relatively sharp terminal edge 39 which extends below the surface 35 of the head 32 and which is spaced a slight distance outwardly of the outside diameter of the threads 33. The tapered wall 38 extends inwardly to a point which is inside the outside diameter of the threads 33. The head 32 is provided with the usual slot 40 for receiving the operating blade of a turning tool.

In forming the fastener 30 the projecting rib or ring formation 36 is preferably formed on the surface 35 of the head 32 before the threads 33 are rolled on the stem 31 and the threads 33 are continued as close as practical to the projecting edge 39 thereof, without damaging the latter.

In using the fastener 30 it is inserted in the aperture 41 which, as shown in Fig. 7, may be a plain bore in the outer one of two plate members 42 and 43 which are adapted to be secured together by the fastener. As the fastener 30 is advanced to bring the under surface 35 of the head 32 into engagement with the outer surface 44 of the plate 42 the marginal edge 39 of the ring formation 36 will bite into the work material and force portions thereof inwardly toward the stem 31 to form a shoulder or burr 45 which will resist the reverse rotation of the stem 31 by obstructing the path of the threads 33 in the same manner as in the form of the fastener previously described.

In both forms of the invention which are illustrated the locking shoulder is located on the under surface of a head member which is formed integral with the threaded stem of a bolt or screw. The invention is also applicable to a nut or similar separable member which is associated with a threaded stud, or the like, the shoulder being located on the under surface of the nut in the same manner as on the bolt or screw head and being effective, when the nut is rotated to engage the same with the work, to displace the work material and jam it against the threads to frictionally hold the stud against retractive movement.

One of the illustrated fasteners is shown seated in a threaded aperture (Fig. 4) and the other one is shown seated in a plain bore (Fig. 7). Either fastener may be used effectively in an aperture of either type or in any partially threaded, partially plain aperture of the proper size.

It will be further understood that while in the drawings (Figs. 4 and 7) and in the above description of the fasteners the material of the work piece at the surface which is engaged by the rib members 17 and 36 is shown and described as being moved toward the axis of the bore in which the fastener is received, the action of the ribs 17 and 36 results in movement of the material within an area extending inwardly, in the direction of the axis of the bore, some distance from the surface of the work piece so that the inside diameter of the bore is reduced and the inside surfaces thereof engage with the stem of the fastener and bend the same against accidental reverse turning movement.

While particular materials and specific details of construction have been referred to in describing the illustrated forms of the fastener, it will be understood that other materials and other details of construction may be resorted to within the spirit of the invention.

I claim:

A work holding fastener comprising a threaded stem member which is adapted to be turned into a cooperating aperture in the work with the stem threads and the grooves between the same entering and receiving cooperating grooves and threads in the work material aperture, a head member integral with said stem member having a downwardly facing surface in a plane normal to the long axis of said stem member, and a substantially ring-like continuous spiraled rib formation on said downwardly facing surface, said rib formation having an outer surface substantially parallel to said axis and a tapered inner surface intersecting said outer surface at a relatively sharp edge, which edge is spaced below the downwardly facing surface of the head member and has its leading outer portion of slightly greater diameter than the outside diameter of the stem threads and spiraling inwardly therefrom, said stem member having an annular unthreaded portion having a diameter less than the crest diameter of said stem member threads below said head member and inwardly of said rib formation, said edge acting to engage and cut into the work material and said inner surface acting to displace portions of the work material inwardly toward said stem upon rotation of the head to engage the spiraled rib formation against the surface of the work adjacent said aperture whereby to provide an inward obstruction in said aperture which is effective to resist movement of the stem in the direction to remove the same from said aperture.

References Cited in the file of this patent

UNITED STATES PATENTS

| | | |
|---|---|---|
| 1,928,157 | Levin | Sept. 26, 1933 |
| 1,953,305 | Maclean | Apr. 3, 1934 |
| 1,974,150 | Creveling | Sept. 18, 1934 |
| 2,041,809 | Bernhard | May 26, 1936 |
| 2,147,209 | Olson | Feb. 14, 1939 |
| 2,298,552 | Du Vall | Oct. 13, 1942 |
| 2,405,402 | Carter | Aug. 6, 1946 |
| 2,833,326 | Knohl | May 6, 1958 |